(12) United States Patent
Pyc et al.

(10) Patent No.: US 9,837,002 B2
(45) Date of Patent: Dec. 5, 2017

(54) UNIVERSAL COLUMN DISPLAY SYSTEM

(71) Applicant: Graphic Resource Group, Troy, MI (US)

(72) Inventors: Chester Allen Pyc, Rochester Hills, MI (US); Jason Knight, Ferndale, MI (US)

(73) Assignee: GRAPHIC RESOURCE GROUP, Troy, MI (US)

( * ) Notice: Subject to any disclaimer, the term of this patent is extended or adjusted under 35 U.S.C. 154(b) by 0 days.

(21) Appl. No.: 14/460,522

(22) Filed: Aug. 15, 2014

(65) Prior Publication Data

US 2015/0047240 A1    Feb. 19, 2015

Related U.S. Application Data

(60) Provisional application No. 61/866,589, filed on Aug. 16, 2013.

(51) Int. Cl.
| | |
|---|---|
| *G09F 15/00* | (2006.01) |
| *G09F 15/02* | (2006.01) |
| *G09F 7/18* | (2006.01) |
| *G09F 7/20* | (2006.01) |
| *F16M 11/04* | (2006.01) |
| *F16M 13/02* | (2006.01) |

(52) U.S. Cl.
CPC ....... *G09F 15/0006* (2013.01); *F16M 11/046* (2013.01); *F16M 13/02* (2013.01); *G09F 7/18* (2013.01); *G09F 7/20* (2013.01); *G09F 15/0012* (2013.01); *G09F 15/0068* (2013.01); *G09F 15/0075* (2013.01); *G09F 15/02* (2013.01); *F16M 2200/061* (2013.01); *G09F 2007/1843* (2013.01)

(58) Field of Classification Search
CPC .............. G09F 15/0037; G09F 15/005; G09F 15/0018; G09F 15/0012; G09F 11/30; G09F 15/0068; G09F 2007/1804; G09F 2007/1813; G09F 2007/1808; F16M 2200/061; F16M 11/38; A47B 97/001
See application file for complete search history.

(56) References Cited

U.S. PATENT DOCUMENTS

| | | | | |
|---|---|---|---|---|
| 659,314 | A * | 10/1900 | Norton ...................... | G09F 7/18 40/607.08 |
| 817,061 | A * | 4/1906 | Griffin ...................... | G09F 7/18 248/219.4 |
| 1,537,523 | A * | 5/1925 | Boland ..................... | G09F 7/20 40/606.15 |
| 1,617,358 | A * | 2/1927 | Wehr ........................ | G09F 7/20 248/486 |
| 2,070,407 | A * | 2/1937 | Knauber ................... | G09F 7/18 40/607.12 |

(Continued)

*Primary Examiner* — Charles A Fox
*Assistant Examiner* — Christopher E Veraa
(74) *Attorney, Agent, or Firm* — Burris Law, PLLC

(57) ABSTRACT

A display apparatus is provided that has multiple contiguously arranged adjustable mounting brackets that each has a proximal base portion and a distal attachment portion. There are a corresponding number of contiguously arranged display frames that are attached to the distal attachment portions of the adjustable mounting brackets. The display frames are designed to accommodate removable displays. The adjustable mounting brackets can be extended and retracted so that the display apparatus can attach to different sized mounting areas.

8 Claims, 9 Drawing Sheets

(56) References Cited

U.S. PATENT DOCUMENTS

| | | | | |
|---|---|---|---|---|
| 2,320,151 A * | 5/1943 | McConaughy | G09F 13/34 40/473 |
| 2,772,494 A * | 12/1956 | Bishop | G09F 13/0413 40/605 |
| 3,429,546 A * | 2/1969 | Porter | G09F 7/20 211/104 |
| 3,612,460 A * | 10/1971 | Smith | G09F 7/18 248/230.9 |
| 3,842,524 A * | 10/1974 | Drueck, Jr. | G09F 7/18 40/606.15 |
| 4,347,678 A * | 9/1982 | Laakso | G09F 7/18 40/607.03 |
| 4,471,548 A * | 9/1984 | Goudie | E04H 12/182 40/610 |
| 5,054,219 A * | 10/1991 | Hoyt | G09F 7/22 40/473 |
| 5,471,775 A * | 12/1995 | Hoyt | G09F 7/20 40/601 |
| 5,649,379 A * | 7/1997 | Hoffman | G09F 13/04 40/575 |
| 6,230,727 B1 * | 5/2001 | Chen | E04H 15/28 135/127 |
| 6,250,003 B1 * | 6/2001 | Phinney | G09F 15/0037 40/333 |
| 6,550,170 B1 * | 4/2003 | Cooper | G09F 15/0037 248/218.4 |
| 6,718,672 B1 * | 4/2004 | Wieringa | G09F 19/22 40/606.18 |
| 7,167,103 B2 * | 1/2007 | Warren | F21S 8/086 307/10.1 |
| 7,237,754 B2 * | 7/2007 | Sparkowski | G09F 15/0037 248/219.1 |
| 7,584,560 B2 * | 9/2009 | Lee | G09F 15/0087 40/473 |
| 7,698,843 B2 * | 4/2010 | Hillstrom | G09F 15/0025 248/121 |
| D618,281 S * | 6/2010 | White | D20/10 |
| 7,779,568 B2 * | 8/2010 | Gettelfinger | G09F 7/20 248/218.4 |
| 7,866,075 B2 * | 1/2011 | Meeker | G09F 7/18 248/466 |
| 2002/0170217 A1 * | 11/2002 | Nelson | G09F 17/00 40/604 |
| 2003/0150147 A1 * | 8/2003 | Bieri | G09F 15/0068 40/603 |
| 2006/0219856 A1 * | 10/2006 | Oh | F16M 11/10 248/274.1 |
| 2011/0023924 A1 * | 2/2011 | Park | E04H 15/50 135/135 |
| 2012/0092310 A1 * | 4/2012 | Lundahl | G09F 15/0037 345/204 |
| 2012/0204456 A1 * | 8/2012 | Dobson | G09F 15/0062 40/610 |
| 2013/0027618 A1 * | 1/2013 | Chen | F16M 11/2092 348/836 |

\* cited by examiner

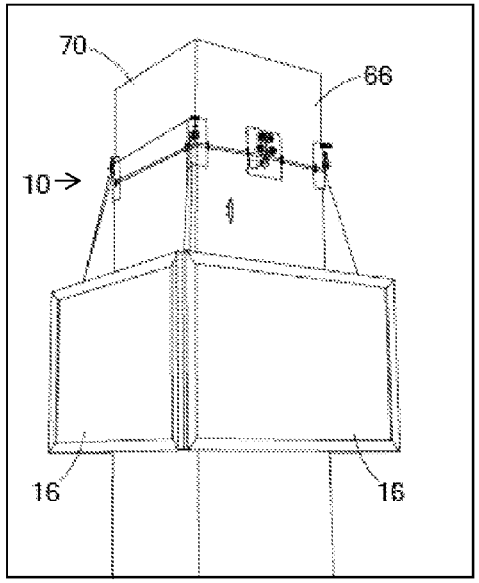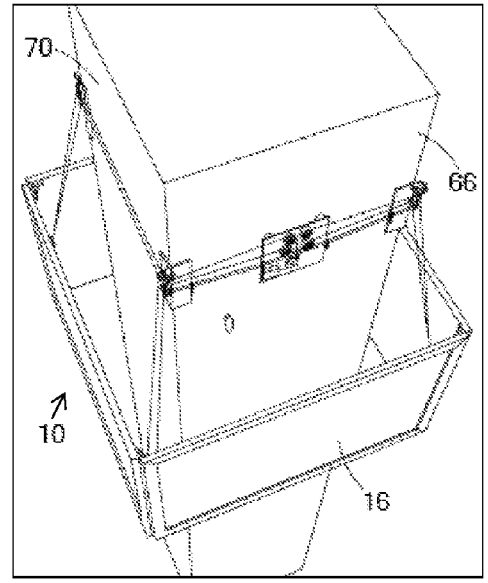
FIG. 8A  FIG. 8B
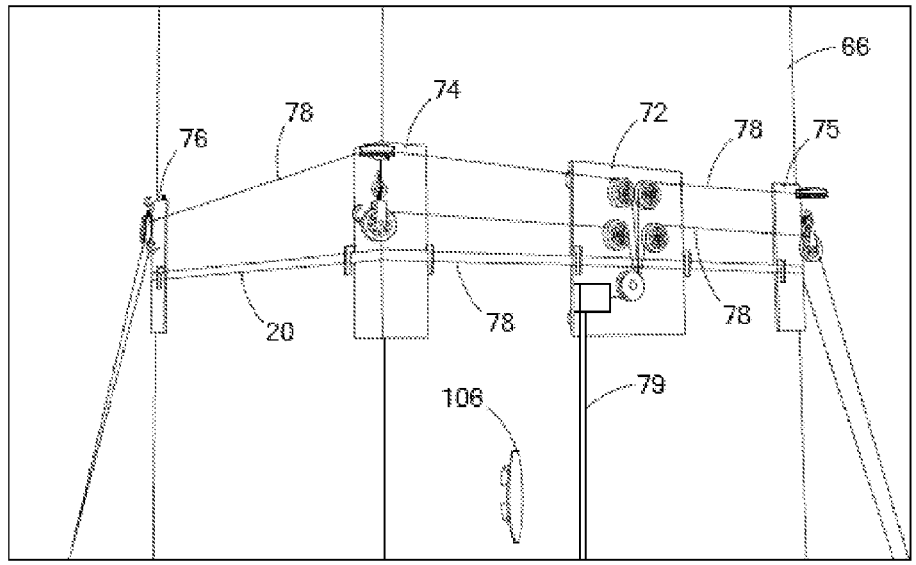
FIG. 9

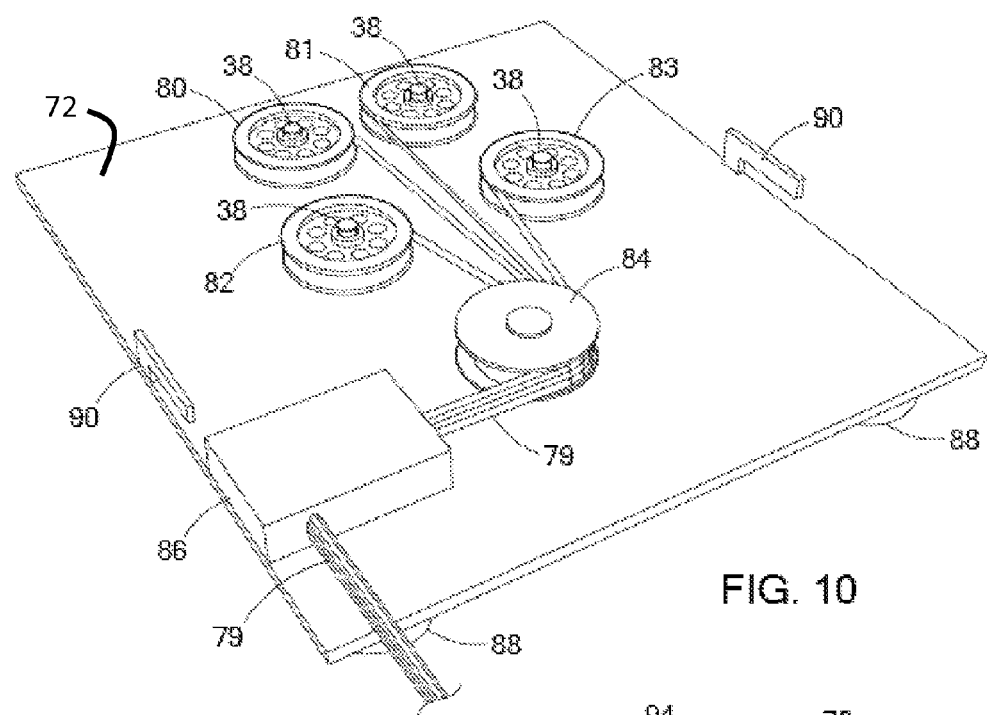
FIG. 10
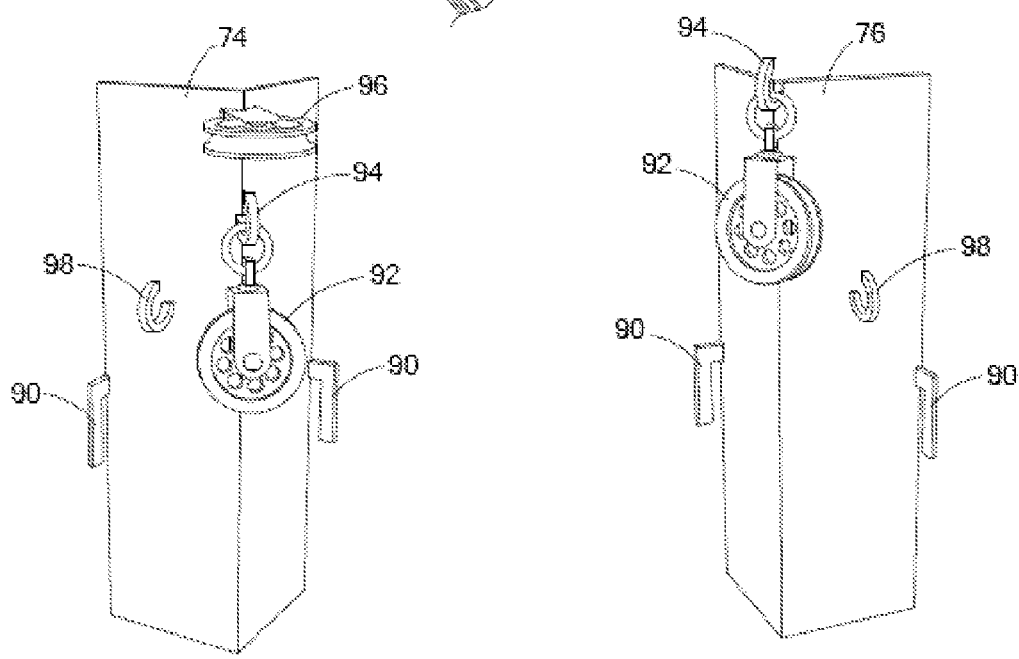
FIG. 11                    FIG. 12

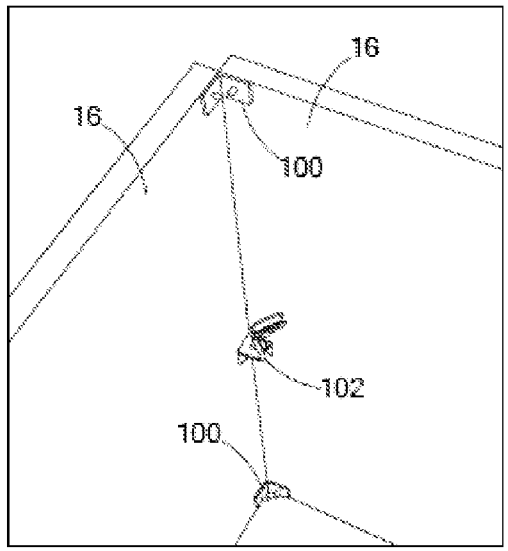 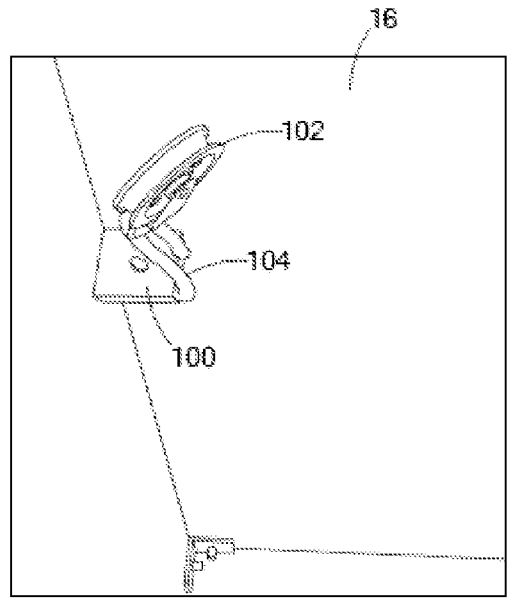
FIG. 13  FIG. 14
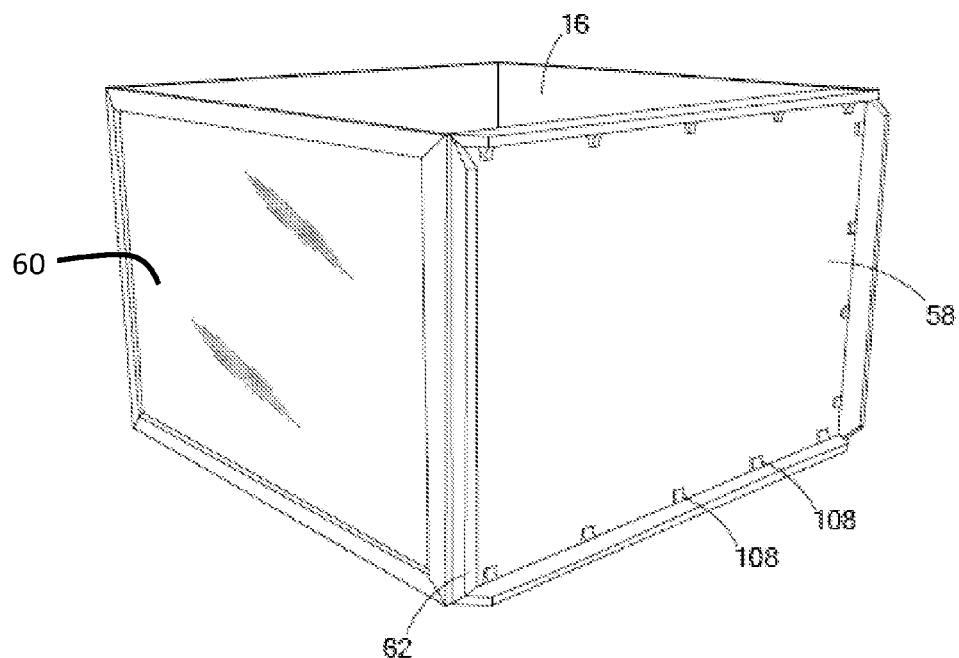
FIG. 15

UNIVERSAL COLUMN DISPLAY SYSTEM

CROSS-REFERENCE TO RELATED APPLICATIONS

This application claims the benefit under 35 U.S.C. §119(e) of U.S. Provisional Application No. 61/866,589, filed on Aug. 16, 2013, the entire content of which is incorporated herein by reference.

FIELD

The present disclosure relates to advertising and more specifically to devices for use in displaying advertisements.

BACKGROUND

The statements in this section merely provide background information related to the present disclosure and may not constitute prior art.

Retail stores are constantly looking for new ways to display their marketing messages. However, space is often limited in retail stores, and most of it must be used to display merchandise. Therefore, retail stores are left with limited options on how to effectively display marketing messages without using valuable space that can be used to display merchandise.

Often overlooked areas of the typical retail store are columns. Columns are essential to the structural integrity of the retail store, but they occupy precious space. Rather than merely ceding columns as lost space, retailers have attempted to use columns to display their marketing messages.

However, using columns to display marketing messages poses a number of problems. Columns come in many different shapes: some might have flat surfaces while others have curved surfaces. Columns also come in many different sizes: some might be large while others are small. Additionally, columns aren't always bare. Conduits, fire extinguishers, and other obstacles exist that prevent retailers from easily and effectively displaying their marketing messages on columns.

Some retailers have attempted to hang banners on columns; however, all of the characteristics of columns discussed previously make what is usually a simple task much more complicated. Banners have to be customized for each unique column due to the different sizes and shapes of columns, along with where conduits, fire extinguishers, and other obstacles are located on the column. Additionally, in order to properly attach these banners to the column, the column itself often must be permanently damaged, such as by using a nail or other damaging fastener. These issues make it expensive and time consuming to display a marketing message on a column.

Additionally, marketing messages do not last forever, and most marketing campaigns change frequently. Changing banners on columns several times a year can be cumbersome and time consuming. Therefore, it is highly desirable to be able to quickly and efficiently change marketing messages several times a year.

Most retailers have many different marketing messages that they would like to display at once. Using a column to display a single marketing message using a banner or a similar device is already difficult enough. Attempting to display multiple marketing messages on a single column using the current methods would be even more impracticable, and in some cases impossible.

Therefore it is highly desirable to have a device that assists retail stores in using columns to easily and effectively display marketing messages. It is also highly desirable to have a device that can be universally used with different sized and shaped columns while avoiding conduits, fire extinguishers, and other obstacles commonly found on columns. Additionally, it is highly desirable to have a device that allows marketing messages to be easily and inexpensively changed when displaying these messages on columns.

SUMMARY

In one form of the present disclosure, a display apparatus is provided that comprises a plurality of contiguously arranged adjustable mounting brackets with each adjustable mounting bracket having a proximal base portion and a distal attachment portion. The display apparatus also comprises a plurality of contiguously arranged display frames that are secured to the distal attachment portions of the corresponding adjustable mounting brackets. The display frames are designed to accommodate removable signage, while the adjustable mounting brackets are proximally and distally extendable to accommodate different sized mounting areas.

In another form of the present disclosure, a display apparatus is provided that comprises a plurality of contiguously arranged adjustable mounting brackets. The display apparatus also comprises a plurality of adjustable scissor brackets with each adjustable scissor bracket having a proximal end and a distal end. The adjustable mounting brackets are attached to the proximal ends of the corresponding adjustable scissor brackets. The display apparatus also has a plurality of contiguously arranged display frames that are secured to the distal ends of the adjustable scissor brackets. The display frames are designed to accommodate removable displays, while the adjustable scissor brackets can be proximally and distally extended to accommodate different sized mounting areas.

In still another form of the present disclosure, a method for displaying media is provided, which includes providing a plurality of contiguously arranged adjustable mounting brackets, with each mounting bracket having a proximal base portion and a distal attachment portion. The method also includes providing a plurality of contiguously arranged display frames that are secured to the distal attachment portions of the corresponding adjustable mounting brackets. The method also comprises adjusting the adjustable mounting brackets by proximally and distally extending them in order to accommodate different sized mounting areas. The method of displaying media also includes fastening a plurality of removable displays to the corresponding display frames and replacing the removable displays with additional removable displays.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 8A is a perspective front view of the display apparatus;

FIG. 8B is a perspective top view of the display apparatus;

FIG. 9 is an enlarged perspective view of the pulley system of the display apparatus;

FIG. 10 is a detailed view of the center pulley plate in the pulley system;

FIG. 11 is a detailed view of one of the front brackets;

FIG. 12 is a detailed view of one of the back brackets;

FIG. 13 is a perspective view showing the interior angle of two contiguously arranged display frames;

FIG. 14 is an enlarged view of one of the display frame pulleys; and

FIG. 15 is a perspective view of the contiguously arranged display frames.

DETAILED DESCRIPTION

Figure 1A:
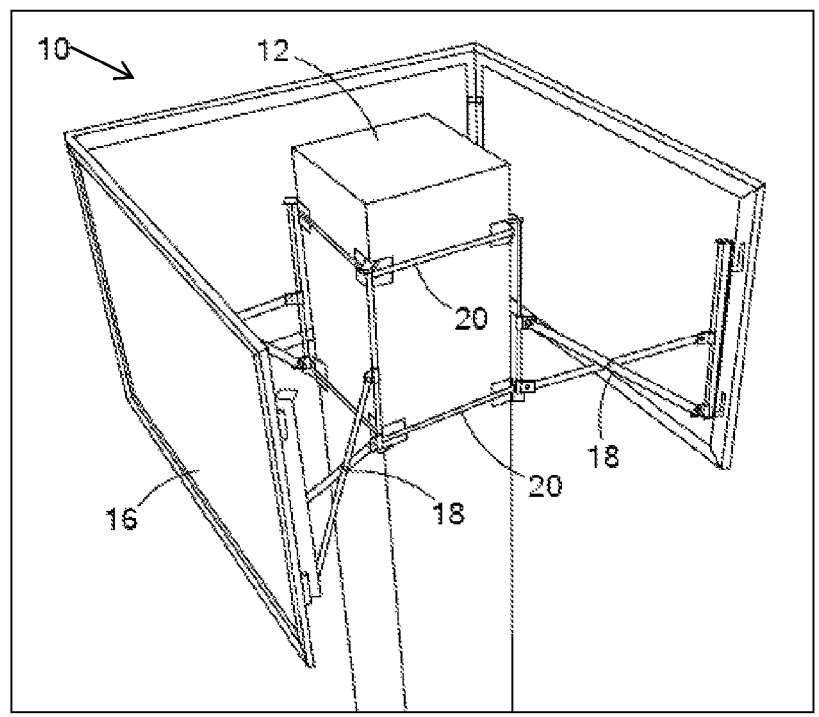
FIG. 1A is a perspective view of the display apparatus secured to a small column.

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Figure 1B:
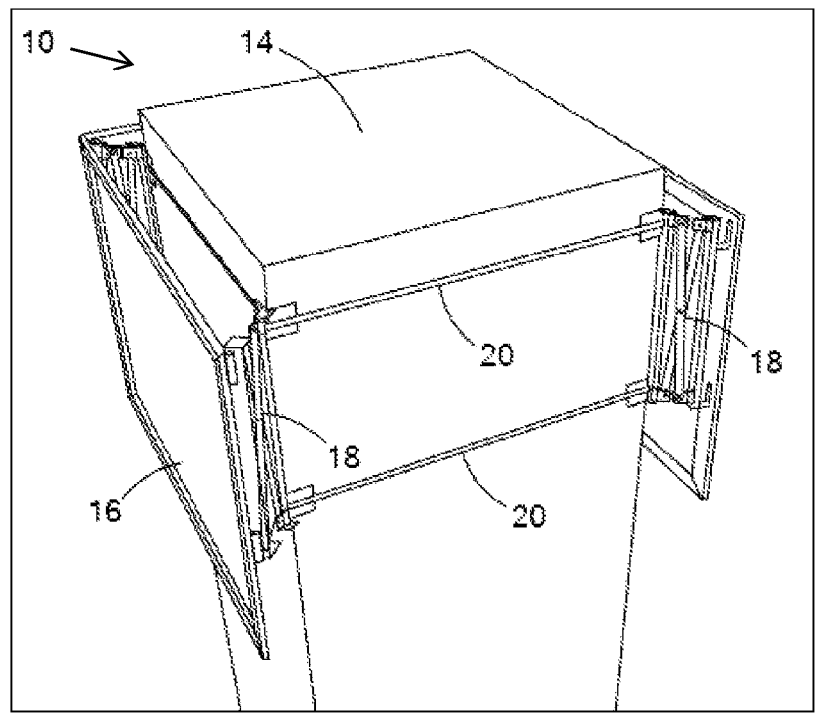
FIG. 1B is a perspective view of the display apparatus secured to a large column.

Referring to FIGS. 1A and 1B, a display apparatus in accordance with the principles of the present disclosures is illustrated and indicated by reference number 10. In FIG. 1A, the display apparatus 10 is shown adjusted to attach to a mounting area, which in this embodiment is a small column 12. In FIG. 1B, the display apparatus 10 is shown adjusted to attach to a mounting area, which in this embodiment is a large column 14. Referring to both FIGS. 1A and 1B, the display apparatus 10 generally includes display frames 16 and adjustable mounting brackets 18. In this embodiment, the adjustable mounting brackets 18 are scissor brackets. However, these brackets can also be, but are not limited to: square brackets, flat brackets, rectangular brackets, arcuate brackets, corner brackets, hinges, static carriage brackets, sliding carriage brackets, outboard brackets, scissor brackets, and ratcheting brackets. The display apparatus 10 is secured to the mounting area, which in these figures are the small column 12 or the large column 14. In this embodiment, the display apparatus 10 is secured to the small column 12 or the large column 14 using ratcheting straps 20. However, the display apparatus 10 can be secured to the small column 12 or the large column 14 using other commonly known methods.

In FIGS. 1A and 1B, the display apparatus 10 has four display frames 16 to correspond to the four surfaces that the small column 12 and the large column 14 have. However, the display apparatus 10 can also be designed to attach to columns of other shapes, such as a column with three sides or a column with curved sides. In the scenario with a three sided column, the display apparatus 10 could have three display frames 16. However, the present invention is not limited to having the same number of display frames 16 as the number of sides on a column.

In FIGS. 1A and 1B, the display frames 16 are contiguously arranged. Contiguously arranged is defined as the display frame 16 neighboring or adjacent to each other.

Figure 2:
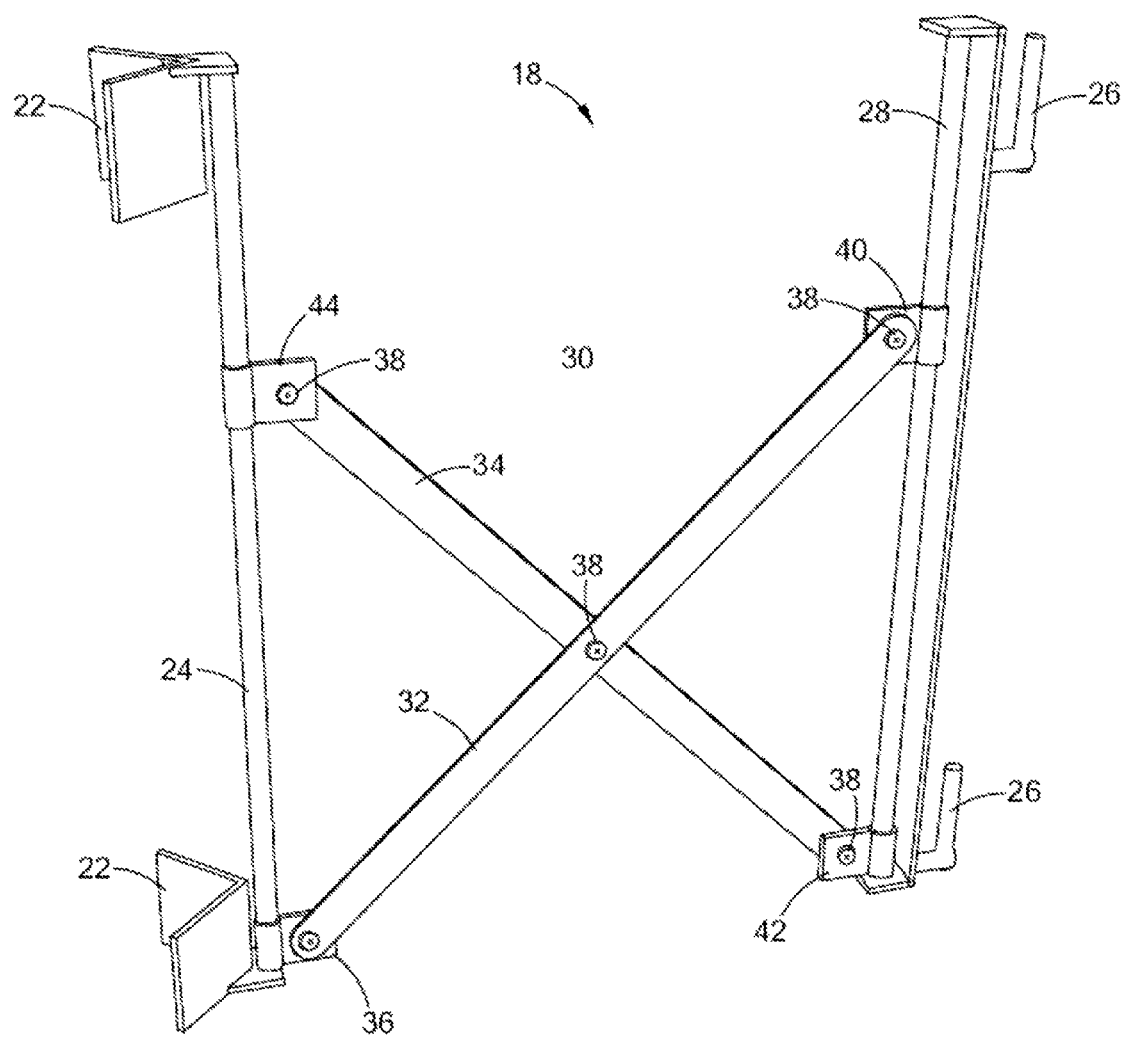
FIG. 2 is a detailed view of one of the adjustable mounting brackets.

Referring now to FIG. 2, one of the adjustable mounting brackets 18 is shown. Each adjustable mounting bracket 18 has at least one inboard bracket 22. The inboard brackets 22 are used to secure the display apparatus 10 to a mounting area. In this embodiment, there are two inboard brackets 22 used, and they are more specifically corner brackets. However, the present invention is not limited to using only corner brackets for the inboard brackets 22. The inboard brackets 22 can be any type of mounting brackets that includes, but are not limited to, square brackets, flat brackets, rectangular brackets, arcuate brackets, corner brackets, hinges, static carriage brackets, sliding carriage brackets, outboard brackets, scissor brackets, and ratcheting brackets. In this embodiment, the inboard brackets 22 mate with the corners of the mounting area, and then a ratcheting strap 20 is wrapped around the column and the inboard brackets 22. The ratcheting strap 20 is then tightened until the inboard brackets 22 are secured to the column by using friction between the inboard brackets and the column.

Multiple inboard brackets 22 are secured to an inboard guide rail 24. The inboard brackets 22 can be secured to the inboard guide rail 24 using any commonly used method of mating pieces together, but it is preferred to weld them together.

Still referring to FIG. 2, outboard brackets 26 are used to secure the adjustable mounting brackets 18 to the display frames 16. As with the inboard brackets 22, each adjustable mounting bracket 18 has at least one outboard bracket 26. In this embodiment, there are two outboard mounting brackets 26 that are male hinge brackets. The outboard guide rail 28 is used to secure the outboard mounting brackets 26. The outboard mounting brackets 26 can be secured to the outboard guide rail 28 using any commonly used method of mating pieces together, but it is preferred to weld them together.

The inboard guide rail 24 and the outboard guide rail 28 are connected to each other using an adjustable scissor bracket 30. The adjustable scissor bracket 30 allows the adjustable mounting bracket to adjust to different sized mounting areas; however, other methods of adjusting the adjustable mounting bracket can be used in place of the adjustable scissor brackets 30. In this embodiment, the adjustable scissor bracket 30 contains a first cross-member 32 and a second cross-member 34. The first cross-member 32 is secured at one end to the inboard static carriage bracket 36 using a rivet 38. The rivet 38, and all subsequent rivets 38, creates a pivot point that allows the connected cross-member to rotate along a plane while not allowing longitudinal motion. The rivet 38, and all subsequent rivets 38, can be replaced with any other fastener that is able to create a pivot point. The inboard static carriage bracket 36 is secured, preferably by welding, to the bottom of the inboard guide rail 24.

The other end of the first cross-member 32 is secured to the outboard sliding carriage bracket 40 using a rivet 38 to create a pivot point. The outboard sliding carriage bracket 40 is secured to the outboard guide rail 28. However, the outboard sliding carriage bracket 40 is still able to freely slide along the length of the outboard guide rail 28.

The second cross-member 34 is secured to the inboard guide rail 24 and the outboard guide rail 28 in a similar manner as the first cross-member 32. However, the second cross-member is secured on one end to the outboard static carriage bracket 42 using a rivet 38 to create a pivot point. The outboard static carriage bracket 42 is secured, preferably by welding, to the bottom of the outboard guide rail 28. The other end of the second cross-member 34 is secured to the inboard sliding carriage bracket 44 using a rivet 38 to create a pivot point. The inboard sliding carriage bracket 44 is secured to the inboard guide rail 24. However, the inboard sliding carriage bracket 44 is still able to freely slide along the length of the inboard guide rail 24.

Still referring to FIG. 2, the first cross-member 32 and the second cross-member 34 are connected to each other at the center of each cross-member using a rivet 38. This rivet 38 creates a pivot point. The inboard sliding carriage bracket 44 and the outboard sliding carriage bracket 40, allow the first cross-member 32 and the second cross-member 34 to extend distally and proximally from the display frames 16. During this distal and proximal extension, the outboard guide rail 28 and the inboard guide rail remain parallel to each other while still allowing the display apparatus 10 to adjust to different sized mounting areas.

Figure 3A:
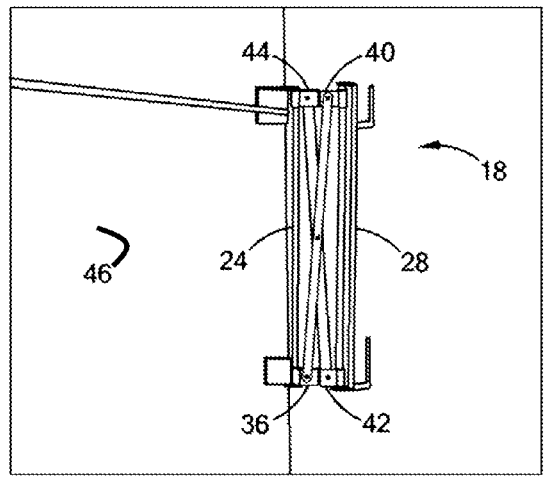
FIG. 3A is perspective view of one of the adjustable mounting brackets in a fully closed position.
Figure 3B:
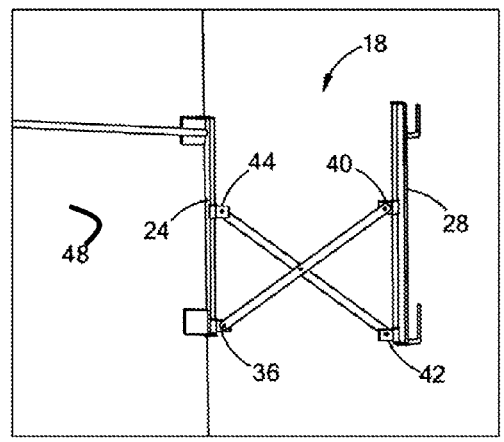
FIG. 3B is perspective view of one of the adjustable mounting brackets in a middle position.
Figure 3C:
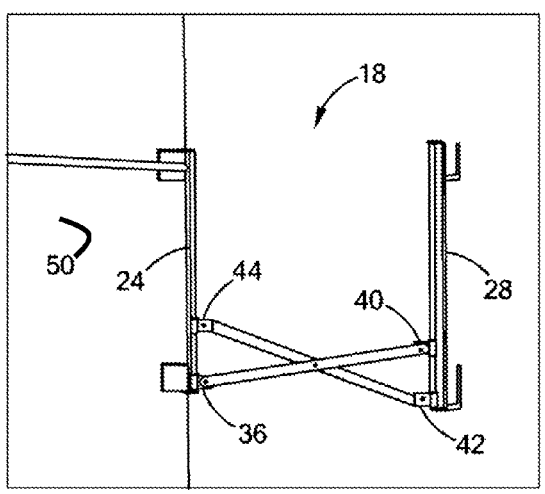
FIG. 3C is perspective view of one of the adjustable mounting brackets in a fully open position.

FIGS. 3A, 3B, and 3C show the adjustable mounting bracket 18 adjusting to different sized mounting areas. FIG. 3A shows the adjustable mounting bracket 18 in a fully closed position adjusting to a largest column 46. In this position, the inboard sliding carriage bracket 44 is at the top of the inboard guide rail 24, and the outboard sliding carriage bracket 40 is at the top of the outboard guide rail 28. Additionally, the inboard guide rail 24 and the outboard guide rail 28 are at their nearest point to each other.

FIG. 3B shows the adjustable mounting bracket 18 in a middle position adjusting to a mid-sized column 48. Here, the outboard guide rail 28 and the inboard guide rail 24 are still parallel to each other, while the outboard sliding carriage bracket 40 and the inboard sliding carriage bracket 44 are at the halfway point of their respective guide rails.

FIG. 3C shows the adjustable mounting bracket 18 in a fully open position adjusting to a smallest column 50. Here, the outboard guide rail 28 and the inboard guide rail 24 are still parallel to each other, while the outboard sliding carriage bracket 40 and the inboard sliding carriage bracket 44 are at the lowest point of their respective guide rails, almost touching their corresponding static carriage brackets.

Figure 4:
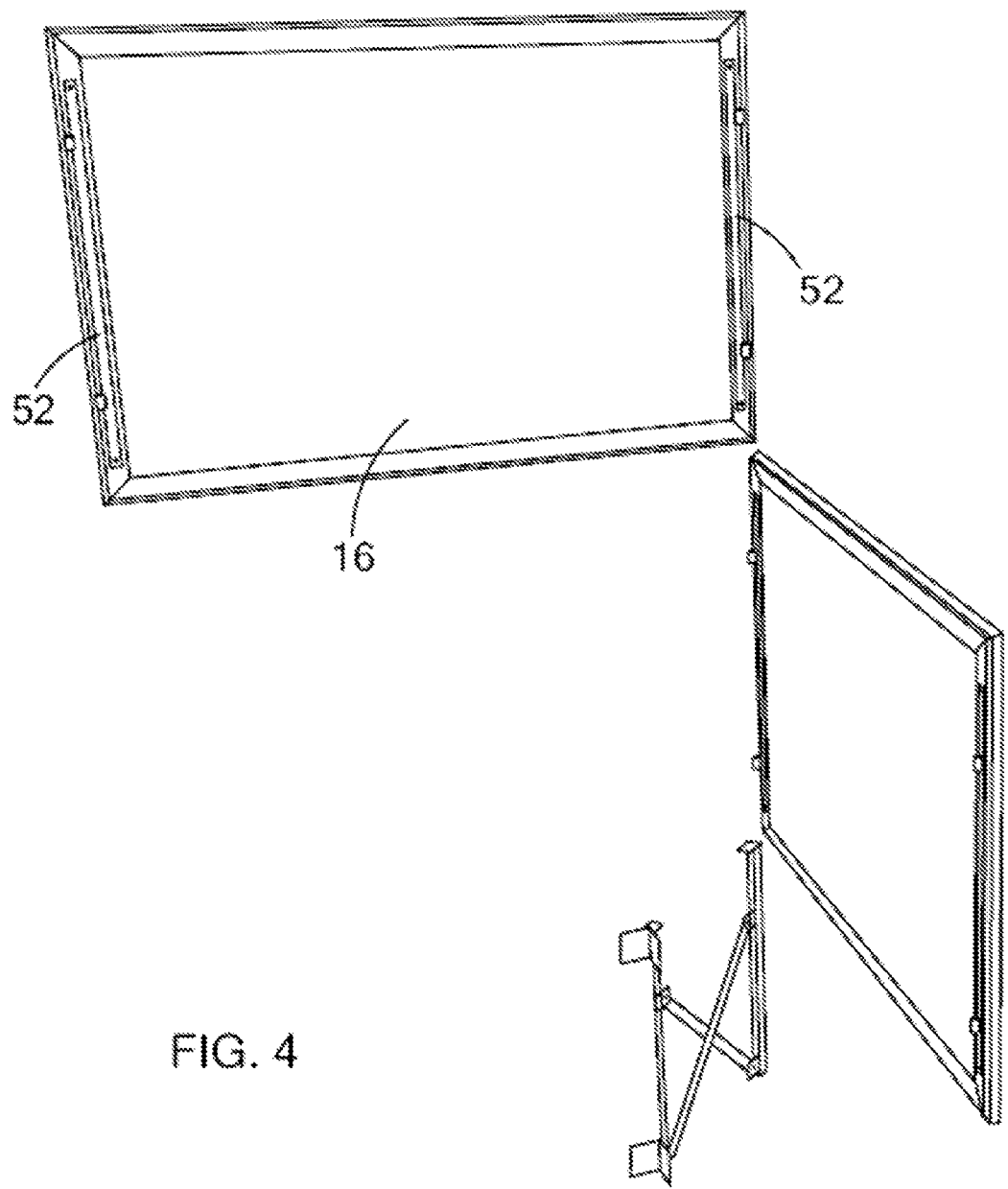
FIG. 4 is a perspective view of the back of one of the display frames.

Referring to FIG. 4, the back of the display frame 16 is shown. Secured to the display frame 16 are two sign brackets 52. In this embodiment, each sign bracket 52 is secured to the display frame 16 using two rivets 38 each. These rivets 38 do not create pivot points, and any other commonly used fastening method can be used to secure the sign brackets 52 to the display frame 16. These sign brackets 52 are used to secure the display frame 16 to the adjustable mounting brackets 18. More specifically, the sign brackets 52 connect to the outboard brackets 26 of the adjustable mounting brackets 18.

Figure 5:
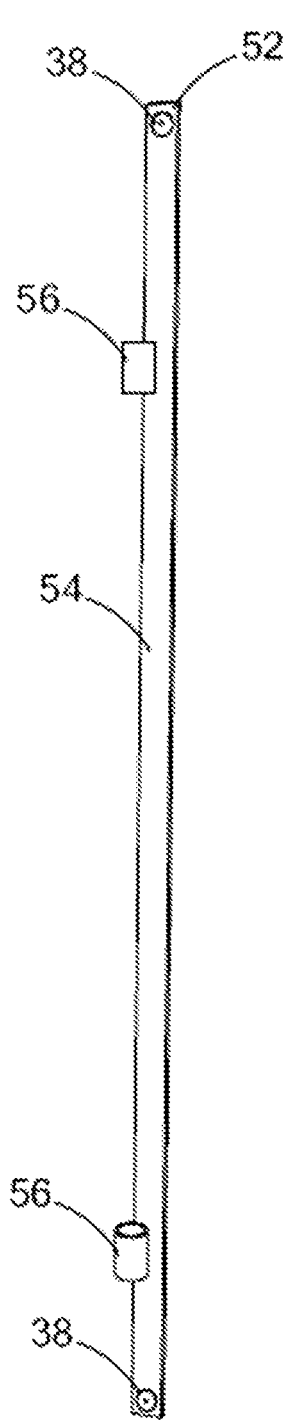
FIG. 5 is a detailed view of one of the sign brackets that attaches to the back of the display frames.

FIG. 5 shows one detailed embodiment of a sign bracket 52 in more detail. Here, the sign bracket 52 is designed to connect to the hinge bracket design of the outboard brackets 26. Each sign bracket 52 has a sign hinge member 54 that is secured to the display frame 16 using rivets 38. There are also two female hinge brackets 56 that are secured to the sign hinge member 54, preferably by welding. The female sign hinge brackets 56 mate with the respective male hinge brackets of the outboard brackets 26. The female hinge brackets 56 stay in place because of gravity.

Figure 6:
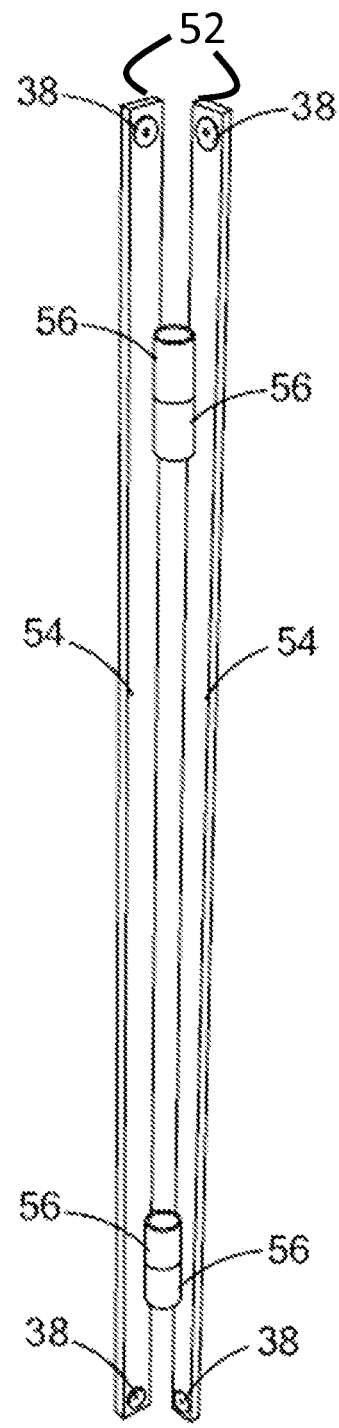
FIG. 6 is a detailed view showing how two contiguously arranged sign brackets interact.

FIG. 6 shows how two sign brackets 52 of contiguously arranged display frames 16 interact. The female hinge brackets 56 on contiguous sign brackets 52 are offset, so that the contiguously arranged display frames 16 can be placed at the same level of height. The offset female hinge brackets 52 are therefore able to mate with the same outboard bracket 26, thus securing both female hinge brackets in place.

Figure 7:
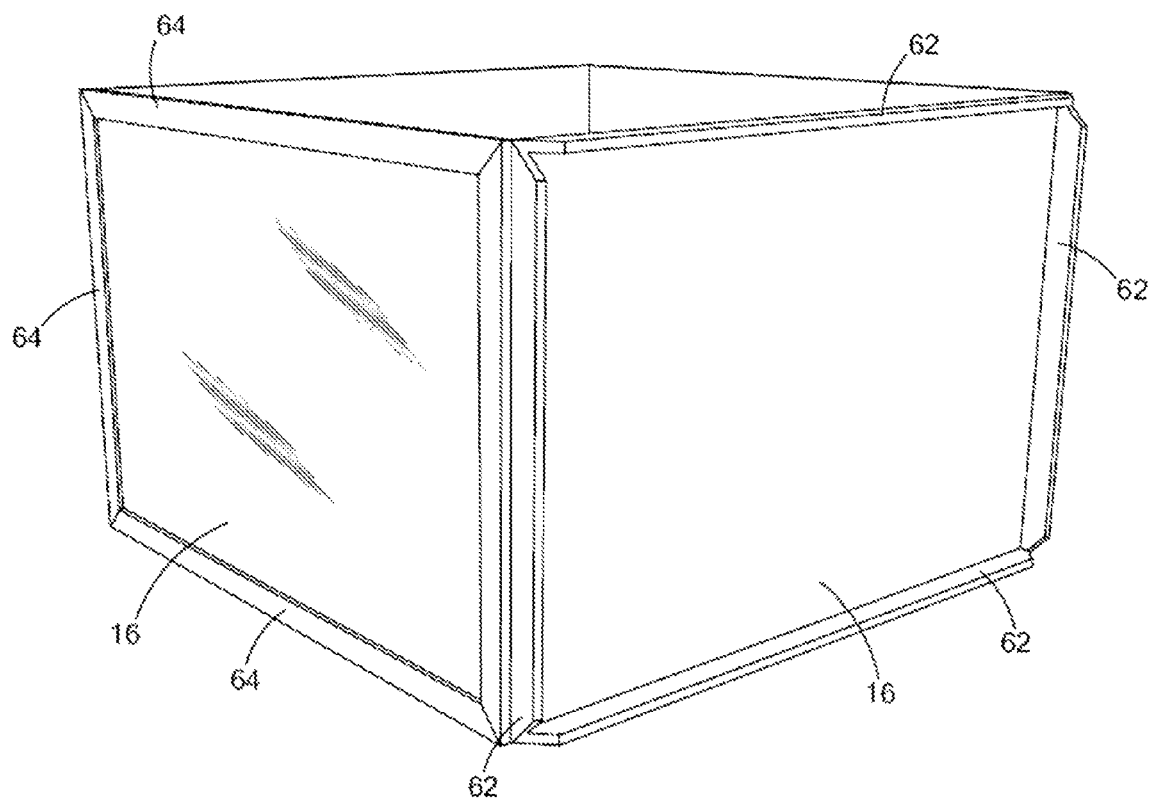
FIG. 7 is a perspective view of several display frames.

FIG. 7 shows the contiguously arranged display frames 16. Each display frame 16 has a backer panel 58 against which a graphic 60 is placed. The graphic 60 does not necessarily need to be an advertisement as this embodiment shows. Then, the graphic 60 is secured using a display holder 62 or 64. In this embodiment, the display holder 62 or 64 is a snap frame, but the display holder 62 or 64 can be any common device used to secure items in displays. The snap frame is shown in its open position 62 and its closed position 64. The graphic 60 is first placed against the backer panel 58 when the snap frame is in its open position 62. Then, the snap frame is pushed into its closed position 64 using a small amount of force to then secure the graphic 60 in place. This process is repeated for the other contiguously arranged display frames 16, with other graphics 60 being placed in each display frame 16.

The display apparatus 10 does not need to be limited to displaying advertisements. The uses of the display apparatus 10 can also include, but are not limited to, displaying non-advertising related messages and mounting multiple televisions.

FIGS. 8A and 8B show another embodiment of the invention. FIG. 8A shows a front view of the display apparatus 10 and FIG. 8B shows a top view of the display apparatus 10. The display apparatus 10 has a pulley system 66 that can raise and lower the display frames 16 on a column 70. In this embodiment, the column 70 has four sides; however, the present invention is not limited to being used with a four sided column. The column 70 can be any number of sides or shapes, or even a cylindrical column.

FIG. 9 shows a zoomed in view of the pulley system 66. In this embodiment, the pulley system 66 has a center pulley plate 72, a left front bracket 74, a right front bracket 75, a left back bracket 76, and a right back bracket 77 (not shown). The pulleys on the pulley system 66 are connected using cords 78. The center pulley plate 72, front brackets 74 and 75, and back brackets 76 and 77 are secured to the column 70 using a ratcheting strap 20; however they can be secured to the column 70 in other ways as well.

FIG. 10 shows a detailed view of the center pulley plate 72. In this embodiment, the center pulley plate 72 has two back bracket pulley wheels: a left back bracket pulley wheel 80 and a right back bracket pulley wheel 81 that correspond to the two back brackets 76 and 77 (not shown), respectively. In this embodiment, the center pulley plate 72 also has two front bracket pulley wheels: a left front bracket pulley wheel 82 and a right front bracket pulley wheel 83 that correspond to the two front brackets 74 and 75 (not shown), respectively. Each pulley wheel is secured to the center pulley plate 72 using a rivet 38 or any other fastener that still allows the pulley to rotate freely. Additionally, the center pulley plate 72 has a flat belt pulley wheel 84 that bundles the cords 78 from the back bracket pulley wheels 80 and 81, and the front bracket pulley wheels 82 and 83, creating a bundle 79. The bundle 79 allows the cords 78 to be manipulated in unison. The bundle 79 is then fed through a locking mechanism 86 that allows the display apparatus 10 to be locked in place after the bundle 79 is manipulated to adjust the display apparatus 10 to its desired location.

Additionally, the center pulley plate 72 has rubber pads 88 that prevent the center pulley plate 72 from damaging the mounting area when the center pulley plate 72 is secured against the mounting area. The rubber pads 88 can be secured to the center pulley plate 72 using glue or any other sort of bonding material. There are also two clamping band tabs 90 that are attached to the center pulley plate 72 using welding or any other bonding method. The clamping band tabs 90 are used in relation with the ratcheting strap 20 to help secure the center pulley plate 72 to the mounting area.

FIG. 11 shows a detailed view of one of the front brackets 74 or 75. Each front bracket 74 and 75 has a swivel pulley 92 that is attached to the front bracket 74 or 75 using a swivel pulley hanging hook 94. The swivel pulley hanging hook 94 is preferably welded to the front bracket 74 or 75, but other ways of securing it are possible. Each front bracket 74 and 75 also has a corner pulley 96. The corner pulley 96 is generally welded to the front bracket 74 or 75, but it can be attached in other ways. Additionally, two clamping band tabs 90, like the ones on the center pulley plate 72, are attached to each front bracket 74 and 75. The clamping band tabs 90 are used to help secure the front brackets 74 and 75 to the mounting area with the ratcheting strap 20. A cord tie-off 98 is preferably welded to the front bracket 74 or 75, but it can be attached using other means.

FIG. 12 shows a detailed view of one of the back brackets 76 or 77. Each back bracket 76 and 77 has a swivel pulley 92 that is attached to the back bracket 76 or 77 using a swivel pulley hanging hook 94. The swivel pulley hanging hook 94 is preferably welded to the back bracket 76 or 77, but other ways of securing it are possible. Each back bracket 76 and 77 also has two clamping band tabs 90 like the ones on the center pulley plate 72. The clamping band tabs 90 are used to help secure the back brackets 76 and 77 to the mounting area with the ratcheting strap 20. A cord tie-off 98 is preferably welded to the back bracket 76 or 77, but it can be attached using other means.

FIG. 13 shows an interior angle of two of the contiguously arranged display frames 16. In this embodiment, the two display frames 16 are secured to each other using two angle irons 100. The angle irons 100 are secured to each display frame using any common fasteners. Each corner mate of the display frames 16 is secured by angle irons 100 to create a 90 degree angle between the display frames 16. Additionally, a display frame pulley 102, is attached to the inside edge of each display frame 16. In this embodiment, each display frame 16 has one corresponding display frame pulley 102 at the right, interior edge of each display frame 16.

FIG. 14 shows a blown up view of one of the display frame pulleys 102. In this embodiment, the display frame pulley 102 is connected to the display frame 16 using an angle iron 100 and an S-hook 104. The display frame pulley 102 is secured, preferably by welding, to the S-hook 104. The S-hook is then secured, preferably by welding, to the angle iron 100. The angle iron 100 is then secured to the display frame 16 using any common fastener.

Referring back to FIGS. 9, 10, 11, 12 and 13, the mechanical function of the pulley system 66 will now be described. The cords 78 are arranged together below the locking mechanism 86 in a bundle 79. The bundle 79 can be pulled to raise the entire display apparatus 10, or it can be released to lower the display apparatus 10. Once the display apparatus 10 is in its desired location on the column 70, the locking mechanism 86 will lock the bundle 79 and hold the display apparatus 10 in place. The bundle 79 can then be secured to the tie-off cleat 106 for storage. The tie-off cleat 106 can be glued, fastened, or secured to column 70 in any common way.

When the bundle 79 is pulled or released, several things happen at once. The cords 78 split off into different directions after passing above the flat belt pulley wheel 84. One cord 78 wraps around the left front bracket pulley 82, extends to the left front bracket 74, and then around the swivel pulley 92 connected to the left front bracket 74. The cord 78 then extends down to a first display frame pulley 102, wraps around that display frame pulley 102, and then extends back up to the left front bracket 74, where the cord 78 is secured to the cord tie-off 98 of the left front bracket 74. The second cord 78, starting from just above the flat belt pulley wheel 84, wraps around the right front bracket pulley 83 and extends to the right front bracket 75. From there, the second cord 78 wraps around the swivel pulley 92 connected to the right front bracket 75, extends down to a second display frame pulley 102, wraps around it, and then is secured on the cord tie-off 98 of the right front bracket 75.

The third cord 78 wraps around the left back bracket pulley 80, then extends to the left front bracket 74 and wraps around the corresponding corner pulley 96. The cord 78 then extends to the left back bracket 76 where it wraps around the corresponding swivel pulley 92. The cord 78 then extends down to a third display frame pulley 102, wraps around it, and then is secured to the cord tie-off 98 of the left back bracket 76. The fourth cord 78 wraps around the right back bracket pulley 81, and then extends to the right front bracket 75 and wraps around the corresponding corner pulley 96. The cord 78 then extends to the right back bracket 77 where it wraps around the corresponding swivel pulley 92. The cord 78 then extends down to a fourth display frame pulley 102, wraps around it, and then is secured to the cord tie-off 98 of the right back bracket 77.

FIG. 15 shows a view of the contiguously arranged display frames 16. Each display frame 16 has a backer panel 58 against which a graphic 60 is placed. The graphic 60 does not necessarily need to be an advertisement as this embodiment shows. Then, the graphic 60 is secured using a display holder 62 or 64. In this embodiment, the display holder 62 or 64 is a snap frame, but the display holder 62 or 64 can be any common device used to secure items in displays. The snap frame is shown in its open position 62 and its closed position 64. The graphic 60 is first placed against the backer panel 58 when the snap frame is in its open position 62. Then, the snap frame, in conjunction with the snap frame hinges 108, is pushed into its closed position 64 using a small amount of force to then secure the graphic 60 in place. This process is repeated for the other contiguously arranged display frames 16, with other graphics 60 being placed in each display frame 16.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A display apparatus, comprising:
a plurality of contiguously arranged adjustable mounting brackets, each of the plurality of adjustable mounting brackets being fixed to a mounting area by an inboard bracket, wherein the plurality of adjustable mounting brackets includes a corresponding plurality of adjustable scissor brackets to allow the plurality of adjustable mounting bracket to adjust in size;
a ratcheting strap wrapped around the mounting area and the inboard brackets of the adjustable mounting brackets, and
wherein the corresponding plurality of adjustable scissor brackets each defines a proximal end and a distal end, and each scissor bracket having an inboard guide rail and an outboard guide rail, and a corresponding inboard sliding carriage bracket adapted to slide along a length of the inboard guide rail, and an outboard sliding carriage bracket adapted to slide along a length of the outboard guide rail, the inboard brackets secured to upper and lower portions of the inboard guide rail;
corresponding sets of contiguously arranged display frames configured to be interchangeably secured to the outboard guide rails, each of the sets of display frames having different sized mounting areas to accommodate a plurality of removable displays,
wherein the plurality of adjustable scissor brackets is proximally and distally extendable to accommodate each of the sets of display frames with different sized mounting areas such that the edges of each display frame are in contact to create a contiguous arrangement of the plurality of removable displays, and
wherein an engagement between the ratcheting strap and the inboard brackets of the adjustable mounting brackets accommodates a plurality of shapes and sizes of the mounting areas by friction.

2. The apparatus of claim 1, wherein the plurality of contiguously arranged adjustable mounting brackets is selected from the group consisting of square brackets, flat brackets, rectangular brackets, arcuate brackets, corner brackets, hinges, static carriage brackets, sliding carriage brackets, outboard brackets, scissor brackets, and ratcheting brackets.

3. The apparatus of claim 1, wherein the display apparatus is made of a material that is at least one of aluminum, plastic, ceramic, and steel.

4. The apparatus of claim 1, wherein the sets of contiguously arranged display frames secures the plurality of removable displays using a plurality of fasteners.

5. The apparatus of claim 4, wherein the plurality of fasteners is at least one of snap frames, hook and loop, screws, bolts, buttons, clips, ties, and hooks.

6. The apparatus of claim 1, wherein the mounting area is a column, the column comprising at least one surface.

7. The apparatus of claim 6, wherein the at least one surface comprises four surfaces.

8. The apparatus of claim 1, wherein the plurality of removable displays comprises advertisements.

* * * * *